(12) United States Patent
Liu

(10) Patent No.: US 12,650,788 B2
(45) Date of Patent: Jun. 9, 2026

(54) MULTI-CONTROL STORAGE SYSTEM IO PROCESSING METHOD AND SYSTEM, AND RELATED COMPONENT

(71) Applicant: SUZHOU METABRAIN INTELLIGENT TECHNOLOGY CO., LTD., Suzhou (CN)

(72) Inventor: Dan Liu, Suzhou (CN)

(73) Assignee: SUZHOU METABRAIN INTELLIGENT TECHNOLOGY CO., LTD., Suzhou (CN)

( * ) Notice: Subject to any disclaimer, the term of this patent is extended or adjusted under 35 U.S.C. 154(b) by 105 days.

(21) Appl. No.: 18/710,591

(22) PCT Filed: Sep. 27, 2022

(86) PCT No.: PCT/CN2022/121922
§ 371 (c)(1),
(2) Date: May 15, 2024

(87) PCT Pub. No.: WO2023/184907
PCT Pub. Date: Oct. 5, 2023

(65) Prior Publication Data
US 2025/0013389 A1      Jan. 9, 2025

(30) Foreign Application Priority Data
Mar. 30, 2022    (CN) .......................... 202210321234.0

(51) Int. Cl.
*G06F 3/06*            (2006.01)
(52) U.S. Cl.
CPC .......... *G06F 3/0659* (2013.01); *G06F 3/0604* (2013.01); *G06F 3/0631* (2013.01); *G06F 3/0689* (2013.01)

(58) Field of Classification Search
CPC .... G06F 3/0659; G06F 3/0604; G06F 3/0631; G06F 3/06
See application file for complete search history.

(56) References Cited

U.S. PATENT DOCUMENTS 5,937,428 A * 8/1999 Jantz ...................... G06F 3/061
                                                              710/39
10,108,481 B1 * 10/2018 Kataria ............... G06F 11/0793
(Continued)

FOREIGN PATENT DOCUMENTS

CN        106527978 A      3/2017
CN        107688514 A      2/2018
(Continued)

*Primary Examiner* — Khoa D Doan
(74) *Attorney, Agent, or Firm* — IPro, PLLC

(57) ABSTRACT

Provided are an IO processing method and system for a multi-control storage system. The IO processing method includes: determining a correspondence between a plurality of strips and a plurality of controllers, so that write processing tasks of all the strips are respectively in the charge of the plurality of controllers, and two strips in the charge of any two controllers do not overlap; receiving an IO task, and determining, from among all the strips, a target strip corresponding to the IO task; determining whether the IO task is a write processing task; if the IO task is a write processing task, determining that a target controller is a controller corresponding to the target strip; if the IO task is not a write processing task, determining that the target controller is any controller; and controlling the target controller to execute the IO task.

14 Claims, 2 Drawing Sheets

(56) References Cited

U.S. PATENT DOCUMENTS

| | | | | |
|---|---|---|---|---|
| 11,061,618 | B1 | 7/2021 | Glimcher et al. | |
| 11,079,969 | B1 | 8/2021 | Glimcher et al. | |
| 11,314,416 | B1 * | 4/2022 | Shveidel | G06F 3/064 |
| 2006/0176904 | A1 * | 8/2006 | Stewart | H04L 69/26 |
| | | | | 370/467 |
| 2016/0132429 | A1 * | 5/2016 | Lin | G06F 3/0665 |
| | | | | 707/814 |
| 2018/0032267 | A1 * | 2/2018 | Koul | G06F 13/4045 |
| 2018/0181328 | A1 * | 6/2018 | Espeseth | G06F 9/5083 |
| 2018/0232314 | A1 * | 8/2018 | Lin | G06F 3/06 |
| 2019/0303008 | A1 * | 10/2019 | Bennett | G11B 20/1833 |
| 2020/0065028 | A1 * | 2/2020 | Keil | G06F 13/1673 |
| 2023/0281117 | A1 * | 9/2023 | Backhausen | G11C 8/12 |
| | | | | 711/103 |

FOREIGN PATENT DOCUMENTS

| | | | |
|---|---|---|---|
| CN | 111290711 A | 6/2020 |
| CN | 112596673 A | 4/2021 |
| CN | 113326005 A | 8/2021 |
| CN | 114415981 A | 4/2022 |

* cited by examiner

MULTI-CONTROL STORAGE SYSTEM IO PROCESSING METHOD AND SYSTEM, AND RELATED COMPONENT

CROSS REFERENCE TO RELATED APPLICATIONS

The disclosure claims priority to Chinese Patent Application No. 202210321234.0, filed to the China National Intellectual Property Administration on Mar. 30, 2022 and entitled "IO PROCESSING METHOD AND SYSTEM FOR MULTI-CONTROL STORAGE SYSTEM, AND RELEVANT COMPONENT", the entire contents of which are incorporated herein by reference.

TECHNICAL FIELD

The disclosure relates to the field of storage system control, in particular to an IO processing method and system for a multi-control storage system, and relevant components.

BACKGROUND

At present, as storage systems have increasingly higher requirements for reliability and performance, the high fault tolerance, high reliability and high performance design of RAID (Redundant Arrays of Independent Disks) has become a necessity. RAID not only needs to perform upper-layer service IO (Input/Output, input/output), but also needs to perform various background tasks, such as inspection, initialization, reconstruction, and there are interaction scenarios between these service IO and background tasks.

SUMMARY

In view of the above, objects of the disclosure are to provide an IO processing method and system for a multi-control storage system, and relevant components. Solutions thereof are described as follows.

An IO processing method for a multi-control storage system, including:

determining a correspondence between a plurality of strips and a plurality of controllers, so that write processing tasks for all the strips are respectively in the charge of the plurality of controllers, and two strips in the charge of any two of the controllers do not overlap;

receiving an IO task, and determining a target strip corresponding to the IO task among all the strips;

determining whether the IO task is the write processing task;

in response to the IO task being the write processing task, determining that a target controller is the controller corresponding to the target strip;

in response to the IO task being not the write processing task, determining that the target controller is any one of the controllers; and controlling the target controller to perform the IO task.

In some embodiments, the controlling the target controller to perform the IO task includes controlling the target controller to perform the IO task by task queuing and strip IO counting.

In some embodiments, the controlling the target controller to perform the IO task includes:

in response to the IO task being the write processing task, controlling the target controller to perform the IO task by Redirect-On-Write (ROW) writing.

In some embodiments, the IO processing method further includes:

in a process of performing the write processing task, prohibiting other controllers from performing a read request task on data that is newly written during performing the write processing task.

In some embodiments, the write processing tasks include background tasks and write operation tasks.

In some embodiments, the background tasks include one or more of reconstruction, inspection, slow disk detection, and initialization.

In some embodiments, the determining a correspondence between a plurality of strips and a plurality of controllers includes:

allocating all the strips to the plurality of controllers through a polling or Hash algorithm.

In some embodiments, the determining a correspondence between a plurality of strips and a plurality of controllers includes:

allocating all the strips to the plurality of controllers evenly.

In some embodiments, the IO processing method further includes:

redetermining the correspondence between all the strips and all the controllers in response to states of the controllers being changed.

In some embodiments, the redetermining the correspondence between all the strips and all the controllers in response to states of the controllers being changed includes:

in response to a number of the controllers being increased or reduced, and/or the controllers being faulted, and/or the controllers being repaired, redetermining the correspondence between all the strips and all the controllers.

In some embodiments, the receiving an IO task and determining a target strip corresponding to the IO task among all the strips includes:

decomposing the IO task according to a strip granularity upon the receipt of the IO task; and determining the target strip corresponding to the decomposed IO task among all the strips.

In some embodiments, in response to the IO task being not the write processing task, determining that the target controller is any one of the controllers includes:

in response to the IO task being a read request task, determining that the target controller is any one of the controllers.

In some embodiments, the controlling the target controller to perform the IO task by task queuing and strip IO counting includes:

in response to existence of a plurality of write processing tasks for the same target strip, controlling the target controller to perform the plurality of write processing tasks one by one by task queuing.

In some embodiments, the controlling the target controller to perform the IO task by task queuing and strip IO counting includes:

in response to coexistence of the write processing tasks and read request tasks for the same target strip, controlling the target controller to determine, by IO counting, whether the target strip is occupied, so that the write processing tasks and the read request tasks coexisted for the same target strip are mutually exclusive performed based on the determination result.

In some embodiments, the controlling the target controller to perform the IO task by task queuing and strip IO counting includes:

in response to existence of a plurality of read request tasks for the same target strip, controlling the target controller to allow the plurality of read request tasks to be performed concurrently.

In some embodiments, in a process of performing the write processing task, prohibiting other controllers from performing a read request task on data that is newly written during performing the write processing task includes:

in the process of performing the write processing task, controlling metadata controller logic addresses of the target controller to be switched from originally-pointed first physical address to pointing a second physical address, so that other controllers are prohibited from performing the read request task on the data that is newly written during performing the write processing task.

In some embodiments, the IO processing method further includes:

allowing a new read request task to access the second physical address after the write processing task is completed.

Accordingly, the present disclosure provides an IO processing system for a multi-control storage system, including:

a relation module configured to determine a correspondence between a plurality of strips and a plurality of controllers, so that the plurality of controllers are respectively in charge of write processing tasks for all the strips, and two strips in the charge of any two of the controllers do not overlap;

a strip determination module configured to receive an IO task, and determine a target strip corresponding to the IO task among all the strips;

a controller determination module configured to determine whether the IO task is the write processing task; in response to the IO task being the write processing task, determine that a target controller is the controller corresponding to the target strip; and in response to the IO task being not the write processing task, determine that the target controller is any one of the controllers; and an action module configured to control the target controller to perform the IO task.

Accordingly, the present disclosure provides an IO processing device for a multi-control storage system, including:

a memory configured to store a computer program; and
a processor configured to, when executing the computer program, implement steps of any of the IO processing methods for the multi-control storage system described above.

Accordingly, the present disclosure provides a non-transitory readable storage medium, wherein the non-transitory readable storage medium is stored with a computer program that, when executed by a processor, implements steps of any of the IO processing methods for the multi-control storage system described above.

BRIEF DESCRIPTION OF THE DRAWINGS

To describe the technical solutions in the embodiments of the disclosure or the related art more clearly, the accompanying drawings required for describing the embodiments or the prior art will be briefly introduced below. Apparently, the accompanying drawings in the following descriptions show only embodiments of the disclosure, and those skilled in the art may still derive other accompanying drawings from these accompanying drawings without creative efforts.

DETAILED DESCRIPTION OF THE EMBODIMENTS

Figures 1, 2:
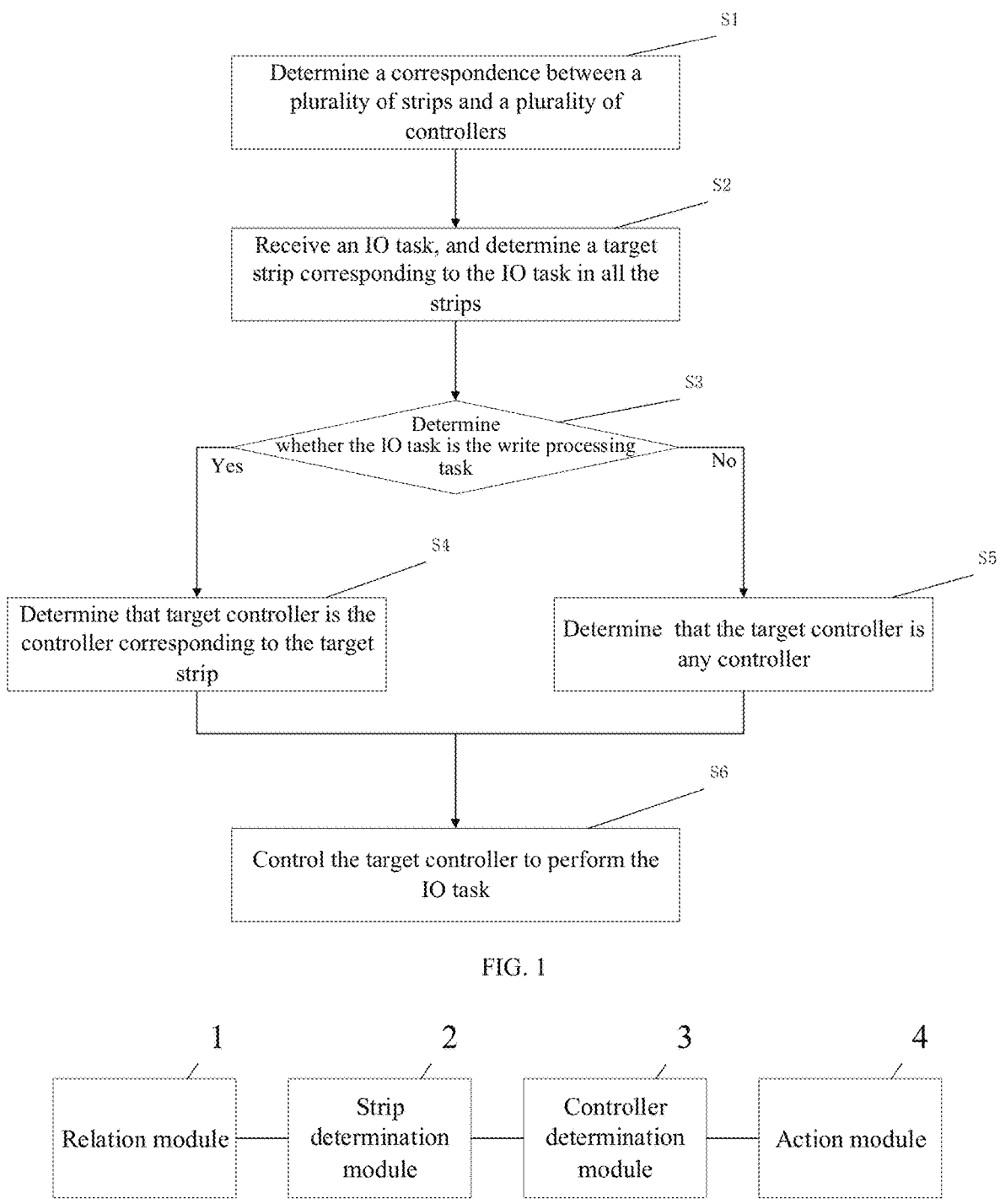
FIG. 1 is a flow diagram illustrating steps of an IO processing method for a multi-control storage system according to an embodiment of the disclosure.
FIG. 2 is a structural distribution diagram of an IO processing system for a multi-control storage system according to an embodiment of the disclosure.

The technical solutions in the embodiments of the disclosure will be clearly and completely described below in conjunction with the accompanying drawings in the embodiments of the disclosure. Apparently, the described embodiments are only a part, but not all, of the embodiments of the disclosure. Based on the embodiments in the disclosure, all other embodiments obtained by those skilled in the art without creative effects shall fall within the protective scope of the disclosure.

In order to ensure the consistency of data when the service IO and the background tasks are performed, a strip lock is usually added between controllers in a dual-control storage system, and the strip lock can ensure that the IO of two controllers is mutually exclusive at the same time. However, the strip lock usually involves multiple inter-frame communications among a plurality of controllers, moreover, the strip lock per se is a resource. When a great amount of service IOs are concurrent, the performances will be affected by steps such as resource application waiting, dual-control communication and lock waiting.

Further, as the system's requirements for reliability and redundant protection capabilities increase, a multi-control storage system exceeding a dual-control storage system is also developing. If the strip lock solution is used in the multi-control storage system for realizing the mutual exclusion of IO, the communication frequency of the controllers will inevitably further increase, resulting in more IO waiting, and the performance is further affected.

In the disclosure, a specific controller is allocated for the write operation of each strip, and a target controller is intentionally allocated when IO tasks are received, so that the write processing task can only be realized by a unique controller, thereby realizing the technical effect that a lock-free mutual exclusion among the IO tasks is ensured.

An embodiment of the disclosure discloses an IO processing method for a multi-control storage system. As shown FIG. 1, the method includes steps below.

At S1, a correspondence between a plurality of strips and a plurality of controllers is determined, so that write processing tasks for all the strips are respectively in the charge of the plurality of controllers, and two strips in the charge of any two controllers do not overlap.

Isolation of addresses space is realized through the correspondence described herein, so that mutually-exclusive tasks can be performed without additional locking among the controllers. To determine the correspondence, all the strips are generally allocated to the plurality of controllers through a polling or Hash algorithm. Usually, all the strips are evenly allocated to the plurality of controllers. At least two controllers are provided, and they mainly play a role of redundancy protection. In some customer systems requiring higher reliability, there are more controllers. Further, the correspondence between the strips and the controllers is not always constant. When states of the controllers are changed, the correspondence between the strips and the controllers is redetermined, so as to ensure that all the strips are in the charge of controllers with normal states. The situation that the states of the controllers are changed include controller addition or recovery, controller reduction or failure.

At S2, an IO task is received, and a target strip corresponding to the IO task are determined among all the strips.

In some embodiments, after the IO task is received, the IO task is decomposed according to strip granularity, and then, one or more target strips corresponding to the IO task are determined.

At S3, it is determined whether the IO task is a write processing task.

At S4, if the IO task is the write processing task, it is determined that a target controller is the controller corresponding to the target strip.

At S5, if the IO task is not the write processing task, it is determined that the target controller is any controller.

It can be understood that the IO task includes a write processing task and a read request task, the write processing task includes background tasks and a write operation, and further, the background tasks are RIAD-specific tasks, including one or more of reconstruction, inspection, slow disk detection, and initialization. It can be understood that the write processing task relates to modification of strip data, which must be performed by the controller corresponding to the target strip in the correspondence, and the IO tasks other than the write processing task (usually the read request task) may be performed by other controllers.

At S6, the target controller is controlled to perform the IO tasks.

In some specific embodiments, the implementation of step S6 includes: the target controller is controlled to perform the IO tasks by task queuing and strip IO counting. It can be understood that the target controller realizes mutual exclusion and high concurrency of IO by using task queuing and strip IO counting; when there exists a plurality of write processing tasks for the same target strip, the target controller is controlled to perform the plurality of write processing tasks one by one by task queuing; when the write processing tasks and read request tasks coexist for the same target strip, generally, mutual exclusion is completed by determining, by active IO counting on the strip, whether the strip is occupied; and if only a plurality of read request tasks exist on the target strip, the plurality of read request tasks are allowed to be performed concurrently. That is to say, the target controllers performing the read request tasks do not always meet the correspondence with the target strip, among all tasks of all the target strips, only the write processing tasks must be realized by an unique corresponding controller, and in the remaining cases, mutual exclusion of the IO can be completed by task queuing and strip IO counting.

In some specific embodiments, if the IO task is the write processing task, the target controller is controlled to perform the IO task by Redirect-On-Write (ROW) writing. It can be understood that during ROW writing, there is a mapping relation between a metadata controller logic address (L, volume address) and a physical address (P1, RAID address) on the upper layer; when there are no write operations, L points to P1, a read request directly accesses the address P1; during the write operations, L points to P2, however, new read request tasks are not allowed to access the address P2 until the write operations are completed and the updating of metadata (L→P2) is completed. That is to say, during the write operations, either the read request tasks are not performed or legacy data of the address P1 is read, and there is no situation that half of the legacy data is read and half of the new data is read. The ROW writing ensures the mutual exclusion between the write processing tasks and the read request tasks.

The disclosure discloses an IO processing method for a multi-control storage system, including: determining a correspondence between a plurality of strips and a plurality of controllers, so that write processing tasks for all the strips are respectively in the charge of the plurality of controllers, and two strips in the charge of any two controllers do not overlap; receiving an IO task, and determining a target strip corresponding to the IO task among all the strips; determining whether the IO task is a write processing task; in response to the IO task being the write processing task, determining that a target controller is the controller corresponding to the target strip; in response to the IO task being not the write processing task, determining that the target controller is any controller; and controlling the target controller to perform the IO task. In the disclosure, the specific controllers are allocated for write operations of all the strips, and the target controller is intentionally allocated when the IO tasks are received, so that the write processing tasks can only be realized by unique corresponding controllers, thereby realizing the technical effect that lock-free mutual exclusion among the IO tasks is ensured.

An embodiment of the disclosure provides an IO processing method for a multi-control storage system, including: determining a correspondence between a plurality of strips and a plurality of controllers, so that write processing tasks for all the strips are respectively in the charge of the plurality of controllers, and two strips in the charge of any two controllers do not overlap; receiving an IO task, and determining a target strip corresponding to the IO task among all the strips; determining whether the IO task is a write processing task; in response to the IO task being the write processing task, determining that a target controller is the controller corresponding to the target strip; in response to the IO task being not the write processing task, determining that the target controller is any controller; and controlling the target controller to perform the IO task. In the disclosure, the specific controllers are allocated for write operations of all the strips, and the target controller is intentionally allocated when the IO tasks are received, so that the write processing tasks can only be realized by unique corresponding controllers, thereby realizing the technical effect that lock-free mutual exclusion among the IO tasks is ensured.

Accordingly, an embodiment of the disclosure further discloses an IO processing system for a multi-control storage system, with reference to FIG. 2, including:

a relation module 1 configured to determine a correspondence between a plurality of strips and a plurality of controllers, so that the plurality of controllers are in charge of write operations for all the strips respectively, and two strips in the charge of any two controllers do not overlap;

a strip determination module 2 configured to receive an IO task, and determine a target strip corresponding to the IO task among all the strips;

a controller determination module 3 configured to determine whether the IO task is a write processing task; if the IO task is the write processing task, determine that a target controller is the controller corresponding to the target strip; and if the IO task is not the write processing task, determine that the target controller is any controller; and an action module 4 configured to control the target controller to perform the IO task.

In the embodiment of the disclosure, the specific controllers are allocated for write operations for all the strips, and the target controller is intentionally allocated when the IO tasks are received, so that the write processing tasks can only be realized by a unique corresponding controller, thereby realizing the technical effect that lock-free mutual exclusion among the IO tasks is ensured.

In some specific embodiments, the action module 4 is further configured to:

control the target controller to perform the IO tasks by task queuing and strip IO counting.

In some specific embodiments, the action module 4 is further configured to:

in response to the IO task being the write processing task, control the target controller to perform the IO task by ROW writing.

In some specific embodiments, the write processing task includes background tasks and write operation tasks.

In some specific embodiments, the background tasks include one or more of reconstruction, inspection, slow disk detection, and initialization.

In some specific embodiments, the relation module 1 is further configured to:

allocate all the strips to the plurality of controllers through a polling or Hash algorithm.

In some specific embodiments, the relation module 1 is further configured to:

in response to states of the controllers being changed, redetermined the correspondence between all the strips and all the controllers.

Figure 3:
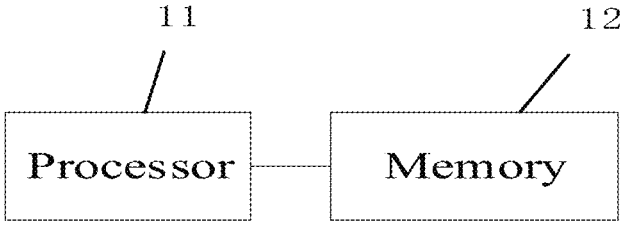
FIG. 3 is a structural distribution diagram of an IO processing apparatus for a multi-control storage system according to an embodiment of the disclosure.

Accordingly, an embodiment of the disclosure further discloses an IO processing device for a multi-control storage system, with reference to FIG. 3, including:

a memory 11 configured to store a computer program; and a processor 12 configured to, when executing the computer program, implement the steps of any IO processing method for the multi-control storage system mentioned above.

Accordingly, an embodiment of the disclosure further discloses a non-transitory readable storage medium, and the non-transitory readable storage medium is stored with a computer program that, when executed by a processor, implements the steps of any IO processing method for the multi-control storage system mentioned above.

Specific detailed contents of the IO processing method for the multi-control storage system can refer to relevant descriptions in the embodiments mentioned above, which is not repeated herein.

The IO processing device for the multi-control storage system and the non-transitory readable storage medium in the embodiments have the same technical effects as the IO processing method for the multi-control storage system in the embodiment mentioned above, and is not repeated herein.

Finally, it should be further noted that relational terms such as first and second used herein are only used to distinguish one entity or operation from another one, but do not necessarily require or imply the presence of any such actual relationship or order between these entities or operations. Moreover, terms "includes", "including" or any other variants thereof are intended to cover non-excludable inclusion, so that a process, method, article or device including a series of elements not only includes those elements, but also includes other elements not listed clearly, or further includes inherent elements of the process, method, article or device. In a case that there are no more limitations, elements defined by the word "including a . . . " do not exclude other same elements further existing in the process, method, article or device including the elements.

The IO processing method and system for the multi-control storage system, and the relevant components provided in the disclosure have been introduced above in detail. The principle and implementations of the disclosure have been described by applying specific examples in the disclosure, and the description for the above-mentioned embodiments is only intended to help the understanding of the method and a core concept thereof in the disclosure. At the same time, those skilled in the art may change specific implementations and application ranges according to the thought of the disclosure. In conclusion, the contents of the present description should not be understood as limitations on the disclosure.

The invention claimed is:

1. An Input/Output (IO) processing method for a multi-control storage system, comprising:

determining a correspondence between a plurality of strips and a plurality of controllers, so that write processing tasks for all the strips are respectively in the charge of the plurality of controllers, and two strips in the charge of any two of the controllers do not overlap;

receiving an IO task, and determining a target strip corresponding to the IO task among all the strips;

determining whether the IO task is the write processing task;

determining that a target controller is a controller corresponding to the target strip in response to the IO task being the write processing task;

determining that the target controller is any one of the controllers in response to the IO task being not the write processing task; and controlling the target controller to perform the IO task by task queuing and strip IO counting;

wherein the controlling the target controller to perform the IO task by task queuing and strip IO counting comprises:

in response to existence of a plurality of write processing tasks for the same target strip, controlling the target controller to perform the plurality of write processing tasks one by one by task queuing;

in response to coexistence of the write processing tasks and read request tasks for the same target strip, controlling the target controller to determine, by IO counting, whether the target strip is occupied, so that the write processing tasks and the read request tasks coexisted for the same target strip are mutually exclusive performed based on the determination result;

in response to existence of a plurality of read request tasks for the same target strip, controlling the target controller to allow the plurality of read request tasks to be performed concurrently.

2. The IO processing method according to claim 1, wherein the controlling the target controller to perform the IO task comprises:

in response to the IO task being the write processing task, controlling the target controller to perform the IO task by Redirect-On-Write (ROW) writing.

3. The IO processing method according to claim 2, further comprising:

in a process of performing the write processing task, prohibiting other controllers from performing a read request task on data that is newly written during performing the write processing task.

4. The IO processing method according to claim 3, wherein in a process of performing the write processing task, prohibiting other controllers from performing a read request task on data that is newly written during performing the write processing task comprises:

in the process of performing the write processing task, controlling metadata controller logic addresses of the target controller to be switched from originally-pointed first physical address to pointing a second physical address, so that other controllers are prohibited from performing the read request task on the data that is newly written during performing the write processing task.

5. The IO processing method according to claim 4, further comprising:

allowing a new read request task to access the second physical address after the write processing task is completed.

6. The IO processing method according to claim 1, wherein the write processing tasks comprise background tasks and write operation tasks.

7. The IO processing method according to claim 6, wherein the background tasks comprise one or more of:

reconstruction, inspection, slow disk detection, and initialization.

8. The IO processing method according to claim 1, wherein the determining a correspondence between a plurality of strips and a plurality of controllers comprises:

allocating all the strips to the plurality of controllers evenly.

9. The IO processing method according to claim 1, further comprising:

redetermining the correspondence between all the strips and all the controllers in response to states of the controllers being changed.

10. The IO processing method according to claim 9, wherein the redetermining the correspondence between all the strips and all the controllers in response to states of the controllers being changed comprises:

in response to at least one of a number of the controllers being increased, the number of the controllers being reduced, the controllers being faulted, the controllers being repaired, redetermining the correspondence between all the strips and all the controllers.

11. The IO processing method according to claim 1, wherein the receiving an IO task and determining a target strip corresponding to the IO task among all the strips comprises:

decomposing the IO task according to a strip granularity upon the receipt of the IO task; and determining the target strip corresponding to the decomposed IO task among all the strips.

12. The IO processing method according to claim 1, wherein the determining that the target controller is any one of the controllers in response to the IO task being not the write processing task comprises:

in response to the IO task being a read request task, determining that the target controller is any one of the controllers.

13. An IO processing device for a multi-control storage system, comprising:

a memory configured to store a computer program; and a processor configured to, when executing the computer program, implement operations of:

determining a correspondence between a plurality of strips and a plurality of controllers, so that write processing tasks for all the strips are respectively in the charge of the plurality of controllers, and two strips in the charge of any two of the controllers do not overlap;

receiving an IO task, and determining a target strip corresponding to the IO task among all the strips;

determining whether the IO task is the write processing task;

determining that a target controller is a controller corresponding to the target strip in response to the IO task being the write processing task;

determining that the target controller is any one of the controllers in response to the IO task being not the write processing task; and controlling the target controller to perform the IO task by task queuing and strip IO counting;

wherein the controlling the target controller to perform the IO task by task queuing and strip IO counting comprises:

in response to existence of a plurality of write processing tasks for the same target strip, controlling the target controller to perform the plurality of write processing tasks one by one by task queuing;

in response to coexistence of the write processing tasks and read request tasks for the same target strip, controlling the target controller to determine, by IO counting, whether the target strip is occupied, so that the write processing tasks and the read request tasks coexisted for the same target strip are mutually exclusive performed based on the determination result;

in response to existence of a plurality of read request tasks for the same target strip, controlling the target controller to allow the plurality of read request tasks to be performed concurrently.

14. A non-transitory readable storage medium, wherein the non-transitory readable storage medium is stored with a computer program that, when executed by a processor, implements operations of:

determining a correspondence between a plurality of strips and a plurality of controllers, so that write processing tasks for all the strips are respectively in the charge of the plurality of controllers, and two strips in the charge of any two of the controllers do not overlap;

receiving an IO task, and determining a target strip corresponding to the IO task among all the strips;

determining whether the IO task is the write processing task;

determining that a target controller is a controller corresponding to the target strip in response to the IO task being the write processing task;

determining that the target controller is any one of the controllers in response to the IO task being not the write processing task; and controlling the target controller to perform the IO task by task queuing and strip IO counting;

wherein the controlling the target controller to perform the IO task by task queuing and strip IO counting comprises:

in response to existence of a plurality of write processing tasks for the same target strip, controlling the target controller to perform the plurality of write processing tasks one by one by task queuing;

in response to coexistence of the write processing tasks and read request tasks for the same target strip, controlling the target controller to determine, by IO counting, whether the target strip is occupied, so that the write processing tasks and the read request tasks coexisted for the same target strip are mutually exclusive performed based on the determination result;

in response to existence of a plurality of read request tasks for the same target strip, controlling the target controller to allow the plurality of read request tasks to be performed concurrently.

* * * * *